US010845530B1

(12) United States Patent
Sejbal et al.

(10) Patent No.: US 10,845,530 B1
(45) Date of Patent: Nov. 24, 2020

(54) LIGHTGUIDE

(71) Applicant: Axis AB, Lund (SE)

(72) Inventors: Stepan Sejbal, Prague (CZ); Pavel Serak, Prague (CZ)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/874,382

(22) Filed: May 14, 2020

(30) Foreign Application Priority Data

Jul. 2, 2019 (EP) .................................. 19183837

(51) Int. Cl.
*F21V 8/00* (2006.01)
(52) U.S. Cl.
CPC .......... *G02B 6/0068* (2013.01); *G02B 6/0045* (2013.01); *G02B 6/0078* (2013.01); *G02B 6/0083* (2013.01)
(58) Field of Classification Search
CPC .. G02G 6/0068; G02G 6/0083; G02G 6/0078; G02G 6/0045; G02G 6/006; G02G 6/0088
See application file for complete search history.

(56) References Cited

U.S. PATENT DOCUMENTS

| 7,121,708 | B2 | 10/2006 | Tsai |
| 7,946,721 | B2 | 5/2011 | Chang |
| 8,894,265 | B2 | 11/2014 | Chang et al. |
| 9,013,652 | B2 | 4/2015 | Tomomasa |
| 9,389,769 | B1* | 7/2016 | O'Keeffe ............. G02B 6/0021 |
| 2003/0169383 | A1* | 9/2003 | Kim ...................... G02B 6/009 |
| | | | 349/58 |
| 2009/0154193 | A1 | 6/2009 | Yamada et al. |
| 2012/0147584 | A1 | 6/2012 | Wu et al. |
| 2013/0329458 | A1 | 12/2013 | Huang |

(Continued)

FOREIGN PATENT DOCUMENTS

| CN | 203350566 U | 12/2013 |
| JP | 11-183730 A | 7/1999 |

(Continued)

OTHER PUBLICATIONS

Extended European Search Report dated Oct. 24, 2019 for the European Patent Application No. 19183837.4.

*Primary Examiner* — Peggy A Neils
(74) *Attorney, Agent, or Firm* — Volpe Koenig

(57) ABSTRACT

A lightguide arrangement for guiding light from several separate LEDs arranged on a PCB to the front of a device comprises a lightguide plate and mounting insert. The lightguide plate is a plate formed in one piece and comprising multiple lightguiding portions A, B, and C, wherein each lightguiding portion has an input portion for receiving light from a light source 108 and an output portion for outcoupling of said light. Adjacent lightguiding portions are interconnected by bridge portions formed by cutouts in the lightguide plate. The lightguide arrangement is characterized in that the mounting insert has ribs protruding from a lower surface thereof and matingly fitting with the cutouts in the lightguide plate to localize the lightguide plate and to restrict propagation of light through the cutouts, and in that the mounting insert comprises attachment means for attaching it to an underlying structure.

16 Claims, 2 Drawing Sheets

(56) References Cited

U.S. PATENT DOCUMENTS

| | | | |
|---|---|---|---|
| 2014/0063847 A1* | 3/2014 | Sakamoto | G02B 6/0068 |
| | | | 362/609 |
| 2017/0017324 A1 | 1/2017 | O'Keeffe | |
| 2017/0299797 A1* | 10/2017 | Ezell | G02B 6/0036 |
| 2018/0239081 A1 | 8/2018 | Maki et al. | |

FOREIGN PATENT DOCUMENTS

| | | |
|---|---|---|
| JP | 2001-066437 A | 3/2001 |
| JP | 2004-006421 A | 1/2004 |

* cited by examiner

LIGHTGUIDE

TECHNICAL FIELD

The present invention relates to lightguides, and to assemblies of lightguides and associated components.

BACKGROUND

In components where a lighting feature is needed in one position, and the light source is arranged in another position, use may be made of lightguides. A lightguide can be used to conduct light from a source of light, e.g. a LED (light emitting diode), to a position where light is needed, e.g. backlighting of a pushbutton. The lightguide may also be used to divide the light from the source of light to several positions, e.g. where a single light source is used for a multitude of indicator lights.

An optical fiber is indeed a lightguide by definition, but for the purposes of the present invention, a lightguide will be closer to a structural part of a device, guiding light from a light source arranged on a PCB to a position where it is visible for a user of the device. This latter functionality is very common for lightguides of various sorts.

A single device may need the functionality of a lightguide in more than one position, e.g. there may be more than one button that should be backlit. In such instances it may be an advantage to assemble all lightguiding functionality into a single lightguide component, or at least aggregate the lightguides into a single component. The advantage lies in a more efficient production and assembly of the device. Furthermore, there may be different colors involved, such that one button should be backlit with one color of light, while another button should be backlit with another color of light. Each button may be lit simultaneously, or at different times, e.g. indicating an operational state of the device. In such situation it is important to minimize crosstalk between the different functional portions of the aggregated lightguide, so that scattering of light from one functional portion of the lightguide to another is minimized. One example of how to accomplish this is to connect the different functional portions with a labyrinth-like structure, which renders it difficult for light to pass, see e.g. U.S. Pat. No. 5,833,994, or to mold or add physical blockages into the lightguide during manufacture, see e.g. U.S. Pat. No. 8,894,265.

An improved design for lightguides is provided, further enhancing some of the advantages associated with lightguides.

SUMMARY

According to a first aspect, a lightguide arrangement. The lightguide arrangement comprises a lightguide plate and a mounting insert. The lightguide plate is formed in one piece and comprises multiple lightguiding portions, each lightguiding portion having an input portion for receiving light from a light source and an output portion for outcoupling of said light. Adjacent lightguiding portions are interconnected by bridge portions formed by cutouts in the lightguide plate. The mounting insert has ribs protruding from a lower surface thereof and the ribs fits matingly with the cutouts in the lightguide plate. The protruding ribs have a dual purpose to localize the lightguide plate while also restricting propagation of light through the cutouts. Also, the mounting insert has attachment means for attaching it to an underlying structure.

This dual use of the mounting insert enables an efficient assembly process with straightforward mounting and simplifies sourcing. Also, the mating fit between the ribs and the cutouts, wherein the cutouts may be configured to be fully or partially extending through a thickness of the lightguide plate, helps in localizing the lightguide plate securely during assembly. Typically, the lightsources are arranged on a PCB, while the lightguide plate is a separate component arranged on top of the PCB. This means that the position of the lightsources and the position lightguide plate have to be aligned, and to that end the cooperation between the ribs and the cutouts serve an important purpose.

In some embodiments the mounting insert may have a cutout for accommodating at least one of the lightguiding portion of the lightguide plate. In these embodiments the ribs of the mounting insert may interact with two bridge portions surrounding the lightguiding portion. In such embodiments the feature of localizing the lightguide plate may be provided even better and more securely, and a single mounting insert may be used to restrict the propagation of light for more than one bridge portion.

For further convenience during manufacture of the component the protruding ribs may be formed in one piece with the remainder of the mounting insert.

The propagation of light into or through the bridge portions may be reduced even further by having a reduced thickness compared to the thickness of the lightguiding portions, and this feature is present in one or more embodiments.

In one or several embodiments areas of the mounting insert overlapping the bridge portions also have a reduced thickness. It is preferred that the thickness of the bridge portions and thickness in these areas combined equals the thickness of the lightguiding portions. This will ensure a flat upper surface of the combination of the lightguide plate and the mounting insert.

It is preferred, in one or several embodiments, that peripheral edges of the lightguiding portions are configured to block or reflect light to prevent propagation of light. Examples of arrangements for providing this effect may be selected from the group comprising: having a matted surface, having a reflective surface, being tinted or colored to absorb radiation, being provided with a coating or tape, being made from a material with light-blocking properties, being provided with a shape resulting in reflection or redirection of light, such as a triangular or slanted cross section.

In some embodiments, there are at least two cutouts defining each bridge portion, extending from opposite longitudinal sides of the lightguide plate across towards the opposite side. The combined length of the cutouts exceeds the distance between said opposite longitudinal sides, preferably such that the cutouts have a principal extension so as to span an entire width of the lightguide plate when seen from the input portion of an adjacent lightguiding portion. In this way it will not be possible for a ray of light propagating directly from the lightsource towards the bridge portion to pass through it without entering one of the cutouts, where the light may be efficiently blocked. Also, even a ray of light having been reflected one time by a peripheral edge portion of the lightguide plate will have difficulties passing through the bridge area, and if it enters the bridge area it will need to be reflected at least one or two times to pass through it to a neighboring lightguiding portion.

The inlet portion may be essentially semicircular and configured to room a light source in a radial center of the semicircle. Other designs are possible, depending on the performance of the lightsource (flux, directionality, etc), and should not be excluded.

It is preferred that the lightguide plate is formed by molding, since this is an efficient method of manufacture, into which several of the functionalities of the lightguide plate may be incorporated. One of these functionalities is detailed further below, while others are described in the detailed description.

The output portions comprise a structural alteration in one surface of the lightguide plate, resulting in an increased scattering of light. The scattered light will be used to illuminate an icon visible to a user, and although other means of manufacture are possible the structural alteration is preferably formed during molding of the lightguide plate. Also, the structural alteration may be configured to increase light scattering with distance from the lightsource, which in combination with the effect that the light intensity typically will decrease with distance, results in a more or less constant intensity of scattered light over the area of structural alteration.

The structural alteration of each output portion may in one or more embodiments be formed from a series of rib-shaped areas essentially traverse to the propagation of light from the lightsource, and wherein a distance between adjacent rib-shaped areas decreases with distance from the lightsource.

In any embodiment, the mounting insert, or at least the protruding ribs thereof, may be configured to obstruct or block light passing from one lightguiding portion to the adjacent lightguiding portion by means of an arrangement selected from the group comprising: having a matted surface, having a reflective surface, being tinted or colored to absorb radiation, being provided with a coating or tape, being made from a material with light-blocking properties, being provided with a shape resulting in reflection or redirection of light, such as a triangular or slanted cross section. There are consequently several manners in which the effect of the mounting inserts ability to block propagation of light may be enhanced.

The attachment means for attaching the mounting insert to an underlying structure may include a snap-hook arrangement formed in one piece with the mounting insert. The snap-hook arrangement is a very convenient solution which is in line with the gist of efficiency and simplicity of the present invention. Still, any other established technique may be used instead, such as adhesive, screws, welds, tape, etc.

According to another aspect a system for user interaction comprises a frame for attachment to a structure, and a display interface for interaction with a user, the system comprising a lightguide arrangement, according to the disclosure of the present application, for guiding light from light sources arranged in the frame to a feature of the display interface.

DETAILED DESCRIPTION OF EMBODIMENTS

Figure 1:
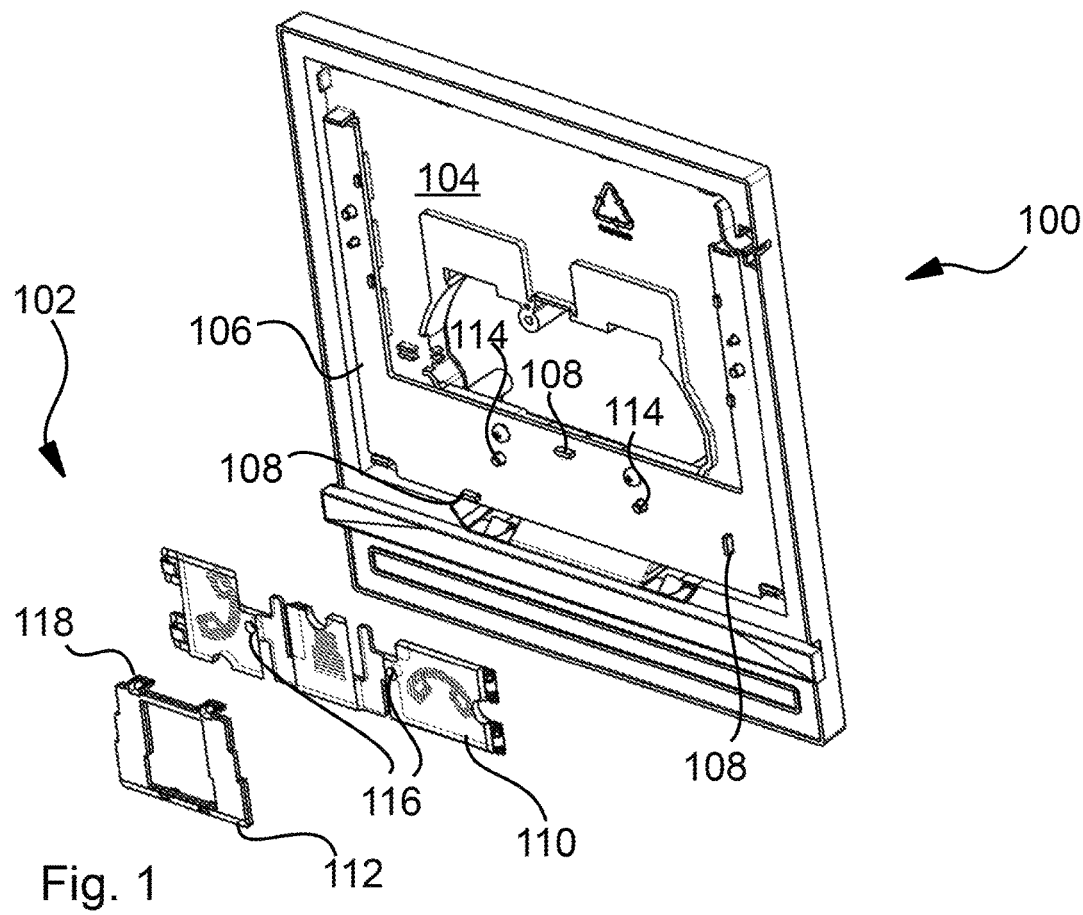
FIG. 1 is an exploded view of an assembly including a lightguide according to one embodiment.

FIG. 1 in an exploded view illustrating an assembly 100 including a lightguide 102 according to one embodiment. The drawing shows a frame 104 of an intercom, in which a printed circuit board (PCB) 106 is fixedly arranged. The PCB 106 may be attached to the frame 102 by means of screws, adhesive or snaplocks, or any other means used in the art. The PCB 106 includes necessary electronics, but for the purposes of the present description it suffices to highlight that it comprises a number of light sources 108. For the present embodiment three light-emitting diodes 108 are arranged on the PCB 106, and it is the light from these that the lightguide 102 is configured to guide.

The lightguide 102 comprises a lightguide plate 110 and a mounting insert 112. The lightguide plate 110 is arranged onto the PCB 106, and it may be guided by guideposts 114 extending from the frame 104, through the PCB 106 and into holes 116 in the lightguide plate 110. In other embodiments the guideposts could extend from the PCB, or have another design, etc. The mounting insert 112, in turn, is arranged over a portion of the lightguide plate 110, and snaps into place over edges of the PCB 106, where it is held in place by means of snap hooks 118 of the mounting insert 112, this also holding the lightguide plate 110 in place. There is much more to elaborate on in relation to the mounting insert 112 and its function, yet that will be detailed in relation to FIG. 3. Following the arrangement of the mounting insert 112 a dispersion film (not shown) may be arranged onto the lightguide 102, and subsequently an at least partially translucent cover plate (not shown) may be arranged to finalize the assembly of the intercom.

Figure 2:
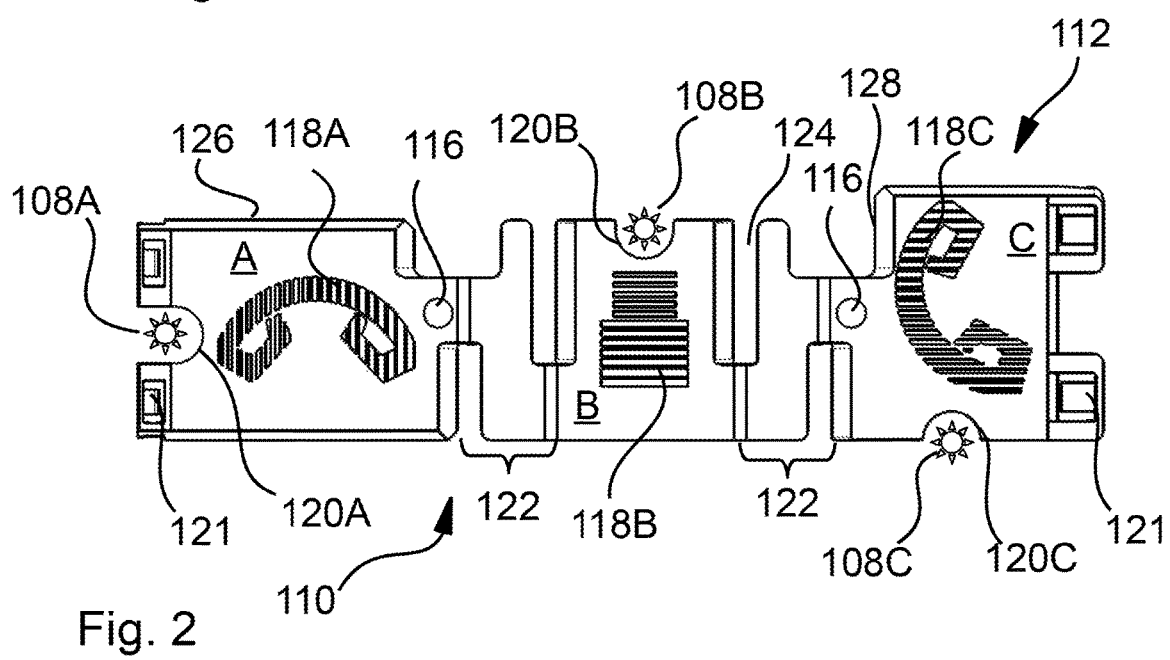
FIG. 2 is a plan view of a lightguide plate according a first.

FIG. 2 is a plan view of a lightguide plate 110 according to a first embodiment. The lightguide plate 110 may be made from a clear polymer material, such as polycarbonate. Any material having suitable properties, i.e. translucent and durable enough, and suitable for optical purposes could be used. Another example is PMMA. In the present embodiment the lightguide plate is preferably manufactured by injection molding, which is an efficient manufacturing method for the component resulting in a quick and efficient manufacturing process with low amounts of waste from trimming. Other options could include compression molding, or machining. When using molding, selected portion of the mold will be surface treated so as to obtain a rough surface (the rest of the surface of the mold being as smooth as possible). These rough surfaces will be used to create the symbols 118A, 118B, 118C as a relief on a surface of the plastic. We will return to the properties of the symbols 118A-C when light propagation through the lightguide plate 110 is described.

In its present embodiment the lightguide plate comprises three lightguiding portions A, B, and C, each lightguiding portion having an input portion 120 for receiving light from a light source 108, schematically illustrated with a star symbol in FIG. 2, although not forming a part of the actual lightguide. The normal light source for this type of application would be a LED, preferably a LED having a directionality in its emission pattern so that most of the light emitted enters the lightguide plate.

The input portion should be designed to receive as much light as possible from the light source, and in the present embodiment an input portion has a semicircular shape Adjacent lightguiding portions are connected by means of bridge portions 122 formed by cutouts 124 (only one of several of which is indicated with a reference numeral in the drawing) in the lightguide plate 110. The cutouts illustrated embodiments extend through the entire lightguide plate, but in other embodiments, not shown, the cutouts may be in the form of recesses only extending through part of the lightguide plate. In the present embodiment the bridge portions 122 are mirror images of each other, which obviously is not is not a requirement. The purpose of each bridge portion 122 is to connect adjacent lightguiding portions structurally, since this enables forming the lightguide plate 110 in one piece. While fulfilling this purpose the bridge portions 122 should minimize the transfer of light from one lightguiding portion to an adjacent one. The shape of a bridge portion is therefore designed to prevent an undisturbed line of sight from the light source 108 of one lightguiding portion to the next lightguiding portion, which is readily seen in FIG. 2. This effect could of course be achieved in several ways, and the limitations are of a practical character in that the bridge portion should be strong and durable enough, and not too complex for the manufacturing process. To further reduce light propagation between adjacent lightguiding portions it is preferred that a single reflection in one of the surfaces of the lightguide plate 110 is not enough to guide light between lightguiding portions. A further feature of the bridge portion (i.e. each bridge portion) is that the thickness of the material is reduced as compared to the lightguiding portions of the lightguide plate. For the illustrated embodiment the thickness of the bridge is half the thickness of the lightguiding portions. This results in that of any light actually reaching the interface between a bridge portion and a lightguiding portion, only half of it will be able to propagate into the bridge portion.

Notably, the holes 116 are arranged close to the interface between a bridge portion and a lightguiding portion, which also assists in blocking propagation of light in unwanted directions as a guide post 114 will block light propagation.

Perimeter portions of the lightguide plate, i.e. the outer edges of the plate providing its interface with the surroundings, are preferable configured to reflect light back into the lightguiding portion from which it originates. Controlling the emission of light from the lightguide plate will reduce scattered light (light pollution) within the lightguide plate, and back into the lightguide plate, while also maximizing the utilization of the available light for the intended purpose. The intended purpose mainly being backlighting of a symbol for user interaction. To achieve this function the perimeter portions may be coated with a reflective coating—to prevent light from escaping while at the same time enable for it to be used—or a coating not dedicated to maximizing reflection—to at least prevent light from escaping the lightguide plate in an undesired manner. To reconnect with the description of the preferred manufacturing process the perimeter portions may be given a surface structure during the molding, yet the preferred solution is that they are given a structural appearance to support reflection. In the present embodiment some portions of the perimeter portions are given a prism shape, essentially a right-angle isosceles triangle with the longer side towards the interior of the lightguide plate, see e.g. edge 126 in FIG. 2, which in combination with the difference in refractive indices between the lightguide plate and its surroundings (i.e. air) vouches for an efficient reflection of light. Other edges of the plate are merely provided with a slanted surface, see e.g. edge 128 in FIG. 2. The slanted surface will not generate an efficient retroreflection, and the purpose is to cancel out the light by directing it up or down to an area not affecting backlighting of the wrong symbol.

Returning now to the function and design of the symbols 118A-C, as illustrated in FIG. 2. The function of the symbols is to direct the light out of the lightguide plate, so that it may be used to backlight a feature of the intercom, in the present case icons indicating capacity buttons to a user, or merely to provide an indication in a particular position visible to a user. As such the symbols are an important part of an output portion. The outline of the symbols, in the present embodiment, mimics the outline of the UX feature to be backlit, so as to ensure an even distribution of light and an efficient use of the light available. As mentioned before, each profile may be formed in the molding process, and as such consists of a structure of protrusions providing a roughened surface. In other embodiments it could instead consist of indentations providing the same roughened surface. The symbol is arranged on the side of the lightguide plate facing the PCB, i.e. on the side remote to a user when the assembly is in use. The light from the lightsource will reach the symbol, either directly or following one or more reflections inside the lightguide plate, and once reaching the symbol it will be reflected and scattered by the surface structure, and in that way, it will backlight the UX feature. The majority of the light being scattered by the symbol is light that has traveled the shortest path to the symbol. This realization result is some design choices, some being visible in FIG. 2. The symbol may be built-up from a rib-like structure, where the ribs extend essentially orthogonal to a propagation direction of the light from the light source. Furthermore, since the intensity of the light will be reduced with distance from the light source, a width of the ribs may increase with the distance from the light source. In this way an intensity "emitted" (i.e. reflected/scattered) from the symbol may be even over the extension of the symbol. Depending on the manufacturing method this effect could be realized in other ways, e.g., by means of a gradual shading of the surface of the symbol, such that the concentration of scattering features increases gradually with the distance from the light source. The rib-like structure is merely an example, and the idea of increasing the concentration of scattering structure with distance from the light source could be accomplished with a pattern of dots, equidistantly arranged but with an increasing diameter, or of equal size but with an increasing concentration of dots.

In instances where the light from the lightguide needs to be smoothed out further, a dispersion film (not shown). For such situations the lightguide plate 112 may also comprise localization clamps 121, which preferable are formed in one piece with the lightguide plate 112 and designed to localize the dispersion film by means of a central tongue in each localization clamp. The design of the localization clamps may differ from the ones illustrated in FIG. 2, yet it is preferable that they have a design appropriate for molding (and in particular demolding).

Figure 3:
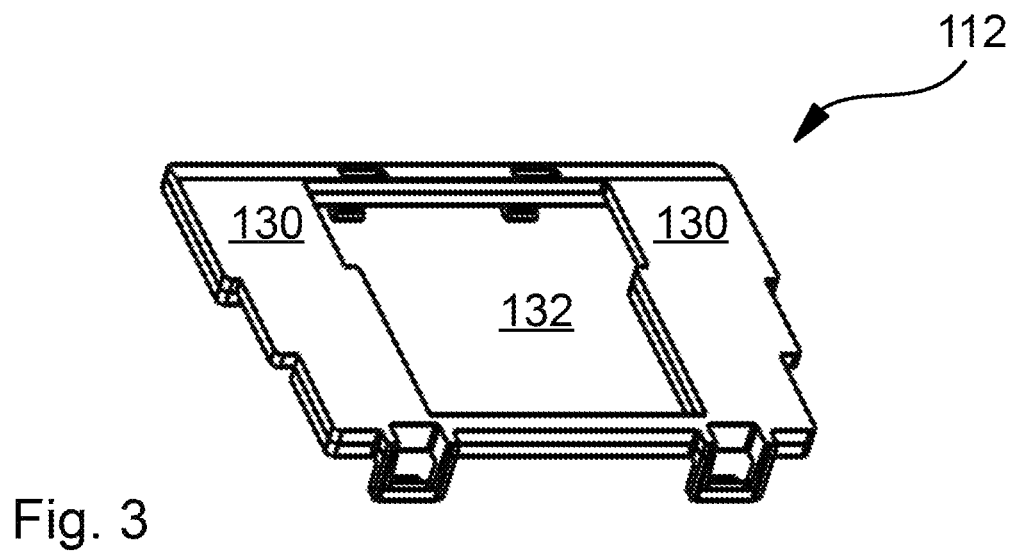
FIG. 3 is a perspective view of a mounting insert which may be used in combination with the lightguide plate of FIG. 2, displaying an upper surface of the mounting insert.
Figure 4:
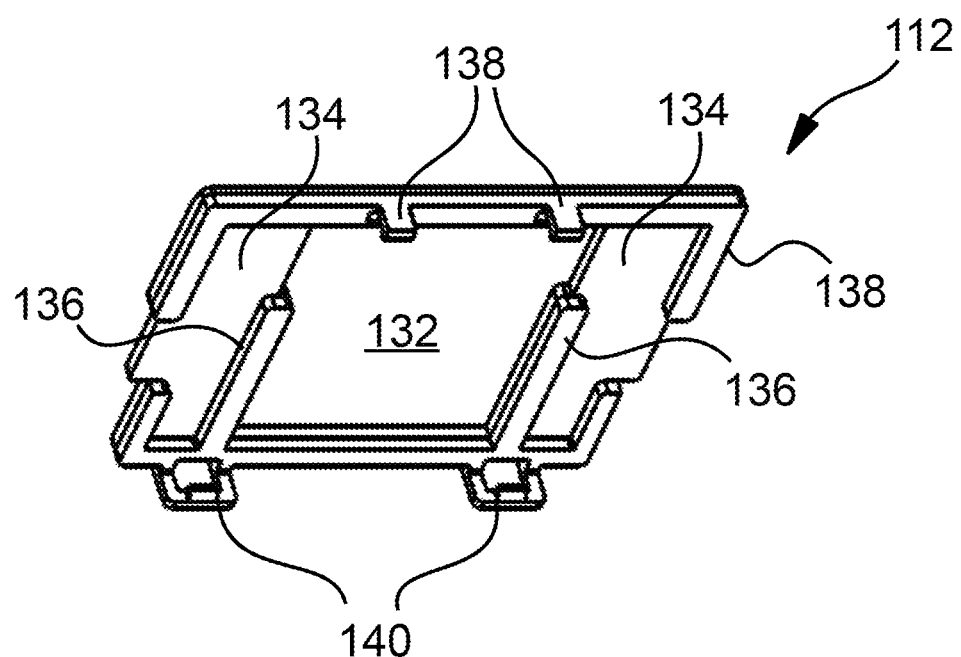
FIG. 4 is a perspective view of the mounting insert of FIG. 3, displaying a lower surface thereof.

FIGS. 3 and 4 are perspective views of a mounting insert 112, from above and below, respectively. In FIG. 3 shows how the mounting insert 112 has an essentially planar upper surface 130 (FIG. 3). The mounting insert of the present embodiment is configured to be located over a lightguiding portion (the central lightguiding portion to be more exact) of the lightguide plate 110. In order not to interfere with the light emission from the central lightguiding portion B there is a cutout 132 in an inner area of the mounting insert. This cutout 132 is shaped to matingly fit with the central lightguiding portion, and the surrounding area 134 (FIG. 4) is shaped to matingly fit with the areas with reduced thickness of the bridge portions. One effect of this is that the upper surface 130 of the mounting insert 112 will be level with the upper surface of the lightguide plate 110, which facilitates arranging further components on top of the lightguide, such as the dispersion film and the front plate mentioned earlier.

Furthermore, the underside, as seen in FIG. 4, of the mounting insert is provided with protrusions in the form of protruding ribs 136, 138 (not all ribs have been provided with a reference numeral). These ribs 136, 138 serve a threefold purpose. The first is that they matingly fit into the cutouts 124 of the lightguide plate 110, and by doing so the mounting insert will localize the lightguide plate 110 securely in all directions (in combination with its clamping function). Notably, also for embodiments where the cutouts have the form of recesses this function of localization will be fulfilled. A second purpose is that they will provide structural rigidity to the mounting insert 112. For that purpose, it is beneficial that, referring to FIG. 4, inner ribs 136 overlap with outer ribs 138 to provide rigidity along the entire extension of the mounting insert 112. The third purpose is in a way the most important one, namely that they will aid in blocking the propagation of light between lightguiding portions A, B, and C. The shape of the ribs, e.g. a slanted surface or a triangular cross section could be used to enhance the blocking efficiency, and as an alternative or complement the portions of the ribs providing the light blocking could be matted or surface coated. Again, surface properties that could be created during a molding process (e.g. the shape or physical matting as oppose to surface coating) are more preferable due to manufacturing efficiency. As a final measure the mounting insert could be made from an opaque material.

The mounting insert has attachment means 138, 140 for attachment to an underlying structure, i.e. underlying in the sense that the lightguide plate may be sandwiched between the mounting insert and said underlying structure. In the present embodiment the attachment means comprises hooks 138 adapted to grip around an edge of the PCB 106 and snaplocks 140 adapted to snap over an opposite edge of the PCB. The attachment means are formed in one piece with the mounting insert, and as such it enables an efficient production of the component, e.g., by means of molding. The skilled person realizes that the attachment means may be varied in numerous ways. Within the realms of snaplocks it could attach to another underlying structure, such as a portion of the frame, holes or cutouts in the PCB, etc. Still, other attachment means could include screws, adhesive, welds, etc., although means that allows for removable attachment are preferred. There are several options for manufacture of the clamp, yet the preferred method is injection molding vouching for efficient production. For streamlining of the manufacturing process the clamp may be made from the same material as the lightguide plate, i.e. polycarbonate, PMMA or other materials for optical usage.

The invention claimed is:
1. A lightguide arrangement, comprising:
an underlying structure comprising a light source,
a lightguide plate, and
a mounting insert,
wherein the lightguide plate is a plate formed in one piece and comprising multiple lightguiding portions, wherein each lightguiding portion comprises an input portion for receiving light from the light source and an output portion for outcoupling of said light,
wherein adjacent lightguiding portions are interconnected by bridge portions formed by cutouts in the lightguide plate,
wherein the mounting insert has ribs protruding from a lower surface of the mounting insert and extending from the mounting insert in a direction towards the lightguide plate, the ribs are configured to matingly fit with the cutouts in the lightguide plate,
wherein the lightguide plate is sandwiched between the mounting insert and the underlying structure, and
wherein the mounting insert further comprises attachment means formed in one piece with the mounting insert, the attachment means are extending from the mounting insert in the direction towards the lightguide plate and attaching the mounting insert to the underlying structure, such that the lightguide plate being sandwiched between the mounting insert and the underlying structure is held in place.

2. The lightguide arrangement of claim 1, wherein the mounting insert also has a cutout for accommodating a lightguiding portion of the lightguide plate, and wherein ribs of the mounting insert interacts with two bridge portions surrounding said lightguiding portion.

3. The lightguide arrangement of claim 1, wherein the protruding ribs are formed in one piece with the remainder of the mounting insert.

4. The lightguide arrangement of claim 1, wherein the bridge portions have a reduced thickness compared to the thickness of the lightguiding portions.

5. The lightguide arrangement of claim 4, wherein areas of the mounting insert overlapping the bridge portions also have a reduced thickness.

6. The lightguide arrangement of claim 5, wherein the thickness of the bridge portions and thickness in these areas combined equals the thickness of the lightguiding portions.

7. The lightguide arrangement of claim 1, wherein peripheral edges of the lightguiding portions are configured to block or reflect light to prevent propagation of light, by means of an arrangement selected from the group comprising: having a matted surface, having a reflective surface, being tinted or colored to absorb radiation, being provided with a coating or tape, being made from a material with light-blocking properties, being provided with a shape resulting in reflection or redirection of light, such as a triangular or slanted cross section.

8. The lightguide arrangement of claim 7, wherein the shape resulting in reflection or redirection of light is a triangular or slanted cross section.

9. The lightguide arrangement of claim 1, wherein there are at least two cutouts defining each bridge portion, extending from opposite longitudinal sides of the lightguide plate across towards the opposite side, and wherein a combined length of the cutouts exceeds the distance between said opposite longitudinal sides, preferably such that the cutouts have a principal extension so as to span an entire width of the lightguide plate when seen from the input portion of an adjacent lightguiding portion.

10. The lightguide arrangement of claim 1, wherein the inlet portion is essentially semicircular and configured to room a light source in a radial center of the semicircle.

11. The lightguide arrangement of claim 1, wherein the output portions comprise a structural alteration in one surface of the lightguide plate.

12. The lightguide arrangement of claim 11, wherein the structural alteration of each output portion is formed from a series of rib-shaped areas essentially traverse to a propagation of light from the light source, and wherein a distance between adjacent rib-shaped areas decreases with distance from the light source.

13. The lightguide arrangement of claim 1, wherein the mounting insert, or at least the protruding ribs thereof, is configured to obstruct or block light passing from one lightguiding portion to the adjacent lightguiding portion by means of an arrangement selected from the group comprising: having a matted surface, having a reflective surface, being tinted or colored to absorb radiation, being provided with a coating or tape, being made from a material with light-blocking properties, being provided with a shape resulting in reflection or redirection of light.

14. The lightguide arrangement of claim 13, wherein the shape resulting in reflection or redirection of light is a triangular or slanted cross section.

15. The lightguide arrangement of claim 1, wherein the attachment means includes a snap-hook arrangement formed in one piece with the mounting insert.

16. A system for user interaction, comprising a display interface for interaction with a user, and a lightguide arrangement according to claim 1, for guiding light from the light source arranged on the underlying structure of the lightguide arrangement to a feature of the display interface.

* * * * *